United States Patent
Le Dren et al.

(10) Patent No.: US 10,011,161 B2
(45) Date of Patent: Jul. 3, 2018

(54) HYDRAULIC CIRCUIT FOR A HYBRID VEHICLE COMPRISING A VERY HIGH PRESSURE CIRCUIT AND SAFETY MEANS IN CASE OF OVERPRESSURE

(71) Applicant: TECHNOBOOST, Paris (FR)

(72) Inventors: Arnaud Le Dren, Brunoy (FR); Franck Roy, Fleury Merogis (FR)

(73) Assignee: TECHNOBOOST, Paris (FR)

( * ) Notice: Subject to any disclaimer, the term of this patent is extended or adjusted under 35 U.S.C. 154(b) by 196 days.

(21) Appl. No.: 15/103,273

(22) PCT Filed: Nov. 13, 2014

(86) PCT No.: PCT/FR2014/052887
§ 371 (c)(1),
(2) Date: Jun. 9, 2016

(87) PCT Pub. No.: WO2015/086934
PCT Pub. Date: Jun. 18, 2015

(65) Prior Publication Data
US 2016/0303962 A1    Oct. 20, 2016

(30) Foreign Application Priority Data
Dec. 12, 2013 (FR) .................. 13 62527

(51) Int. Cl.
*B60K 6/46* (2007.10)
*B60K 6/12* (2006.01)
(Continued)

(52) U.S. Cl.
CPC ............ *B60K 6/12* (2013.01); *B60K 6/46* (2013.01); *F15B 11/08* (2013.01); *F15B 20/007* (2013.01);
(Continued)

(58) Field of Classification Search
CPC .......... F15B 20/007; F15B 11/08; B60K 6/12; B60K 6/46; Y02T 10/6208
See application file for complete search history.

(56) References Cited

U.S. PATENT DOCUMENTS

| 4,674,280 A | 6/1987 | Stuhr | |
|---|---|---|---|
| 8,079,437 B2 * | 12/2011 | Rosman | B60K 6/12 180/165 |
| 2010/0170573 A1 * | 7/2010 | Draper | B60K 6/12 137/68.23 |

FOREIGN PATENT DOCUMENTS

| AT | 395960 B | 4/1993 |
|---|---|---|
| EP | 2481932 A1 | 8/2012 |

(Continued)

OTHER PUBLICATIONS

International Search Report from corresponding International Application No. PCT/FR2014/052887 dated Mar. 17, 2015.
(Continued)

*Primary Examiner* — F. Daniel Lopez
*Assistant Examiner* — Abiy Teka
(74) *Attorney, Agent, or Firm* — Sandberg Phoenix & von Gontard P.C.

(57) ABSTRACT

A hydraulic circuit designed for a hybrid vehicle provided with a hydraulic machine (22) and a pump (20) linked to a transmission (4) driving the wheels of the vehicle, said machine and said pump being linked together in order to allow direct exchanges of fluid that take place in a very high pressure circuit (42) not comprising a pressure accumulator, characterized in that the very high pressure circuit (42) comprises safety means (110) which, in case of overpressure, discharge the fluid to a limited pressure circuit (40) provided with a pressure accumulator (46).

8 Claims, 3 Drawing Sheets

(51) Int. Cl.
*F15B 11/08* (2006.01)
*F15B 20/00* (2006.01)
(52) U.S. Cl.
CPC ....... *B60Y 2200/92* (2013.01); *B60Y 2400/14* (2013.01); *F15B 2211/205* (2013.01); *Y02T 10/6208* (2013.01); *Y02T 10/6217* (2013.01); *Y02T 10/6282* (2013.01)

(56) References Cited

FOREIGN PATENT DOCUMENTS

| FR | 2973302 A1 | 10/2012 |
| GB | 2019537 A | 10/1979 |

OTHER PUBLICATIONS

Written Opinion from corresponding International Application No. PCT/FR2014/052887 dated Mar. 17, 2015.

* cited by examiner

HYDRAULIC CIRCUIT FOR A HYBRID VEHICLE COMPRISING A VERY HIGH PRESSURE CIRCUIT AND SAFETY MEANS IN CASE OF OVERPRESSURE

CROSS-REFERENCE TO RELATED APPLICATIONS

This application derives and claims priority from International Application PCT/FR2014/052887, filed Nov. 13, 2014, and published under International Publication Number WO2015/086934, which derives priority from French application Serial No. 1362527 filed Dec. 12, 2013 and which are hereby incorporated by reference.

BACKGROUND

The present invention relates to a hydraulic system for the traction of a hybrid vehicle, and more specifically a hybrid vehicle with a hydraulic circuit.

French Patent No. 2973302, hereby incorporated by reference, discloses a transmission for a hydraulic hybrid vehicle, having a planetary gear set having three elements that are connected to a thermal engine, a hydraulic pump, and a differential output for driving the motor wheels. The transmission further includes a hydraulic system that works as a motor or pump, which connects to the differential output with several gear ratios.

The hydraulic system comprise a low-pressure circuit and a high-pressure circuit each having of a pressure accumulator for storing energy. The low pressure accumulator maintains a minimum pressure to avoid cavitation of devices. The stored pressures are then recharged for applying a motor torque to the wheels.

Thus, different operation modes are achieved including a "pulse" mode with traction of the vehicle solely by the hydraulic system, the thermal motor being stopped, and a "bypass" mode with traction of the vehicle by the thermal motor which delivers, via the planetary gear, torque to both the differential output, and the pump supplying hydraulic power. In the bypass mode, according to the speed of rotation of the pump, there are an infinite number of gear ratios between the engine and the drive wheels. An additional traction torque provided by the hydraulic system can also be added in this mode.

In a "short connection" mode, the pump is off and the combustion engine delivers a high torque to the drive wheels of the planetary gear set forming a speed reduction gear. In a "long connection" mode, the combustion engine delivers a lower torque from the drive wheels through the planetary gear set, which is blocked. Further in a "braking" mode, the hydraulic system acting on the pump delivers a braking torque to the vehicle, recharging the high-pressure reservoirs.

In addition, the bypass mode can isolate the two circuits of the high-pressure accumulator to work with a very high pressure, above the acceptable pressure for the accumulator, between the pump delivering the flow directly to the hydraulic system operating as a motor. One then obtains with these pumps greater torques and power.

A problem with this type of hydraulic system with devices that can be isolated from a pressure accumulator to work together, is the need to ensure safety in case of accidental overpressure on the high pressure circuit.

Generally speaking, it is necessary for the hydraulic pump of a hybrid vehicle connected to a transmission with hydraulic devices, including a transmission of the type described above, to meet the special needs important for automotive vehicles for production on a large scale, including reduced weight, good compactness, excellent efficiency, high reliability and low cost. An optimized circuit therefore must be provided, which tends to reduce the number of components to enhance these various criteria. In particular, the place in a vehicle is limited, and its weight has a direct effect on energy consumption as well as on its autonomy. Furthermore, the hydraulic circuit must allow for easy maintenance, and must in all cases ensure safety in case of accident or fire.

SUMMARY

The present invention avoids the disadvantages of the prior art. For this purpose, a hydraulic circuit provided for a hybrid vehicle has a hydraulic pump and a pump connected to a transmission driving the wheels of the vehicle. The hydraulic pump and pump are connected together to permit direct exchanges of fluid, which are in a high pressure circuit having no pressure accumulator, wherein the high pressure circuit has a safety device, which in case of overpressure discharges the fluid to a limited pressure circuit fitted with a pressure accumulator.

An advantage of this hydraulic pump is that it ensures the safety of the high-pressure circuit while removing, if necessary, the pressurized fluid to a second circuit which can receive and store it, due to its accumulator.

The hydraulic pump according to the invention may further comprise one or more of the following features, which can be combined together. According to one embodiment, the safety device comprises a rupture disk, which opens to a pressure differential exceeding a threshold. Advantageously, the rupture disk can be opened to pressure differential thresholds that change the direction. The threshold is higher when the pressure of the limited pressure circuit is greater. In particular, the rupture disk may include a membrane separating the two circuits, resting on each side of the partitions of different surfaces to achieve a different rupture threshold.

In this case, the rupture disk can have a circular section support, receiving the membrane within the interior, which is supported on either side on two transverse walls featuring axial drill holes of different diameters.

The safety device may also include a calibrated pressure relief valve which discharges into the limited pressure circuit. The safety device can also include a calibrated check valve to block the flow to the high pressure circuit, which opens in the other direction from a sufficient pressure difference.

Advantageously, the recharging of the pressure circuit to compensate for its limited permanent consumption, is affected by the high pressure circuit via a constantly open flow restriction.

The invention also relates to a hybrid motor vehicle having a power train using hydraulic power, equipped with a hydraulic pump having any one of the preceding characteristics.

DESCRIPTION OF THE DRAWINGS

The invention will be better understood, and other features and advantages will appear more clearly, upon reading the following description given by way of example and without limitation, with reference to the accompanying drawings in which.

Corresponding reference numerals indicate corresponding parts throughout the several figures of the drawings.

DETAILED DESCRIPTION

Figure 1:
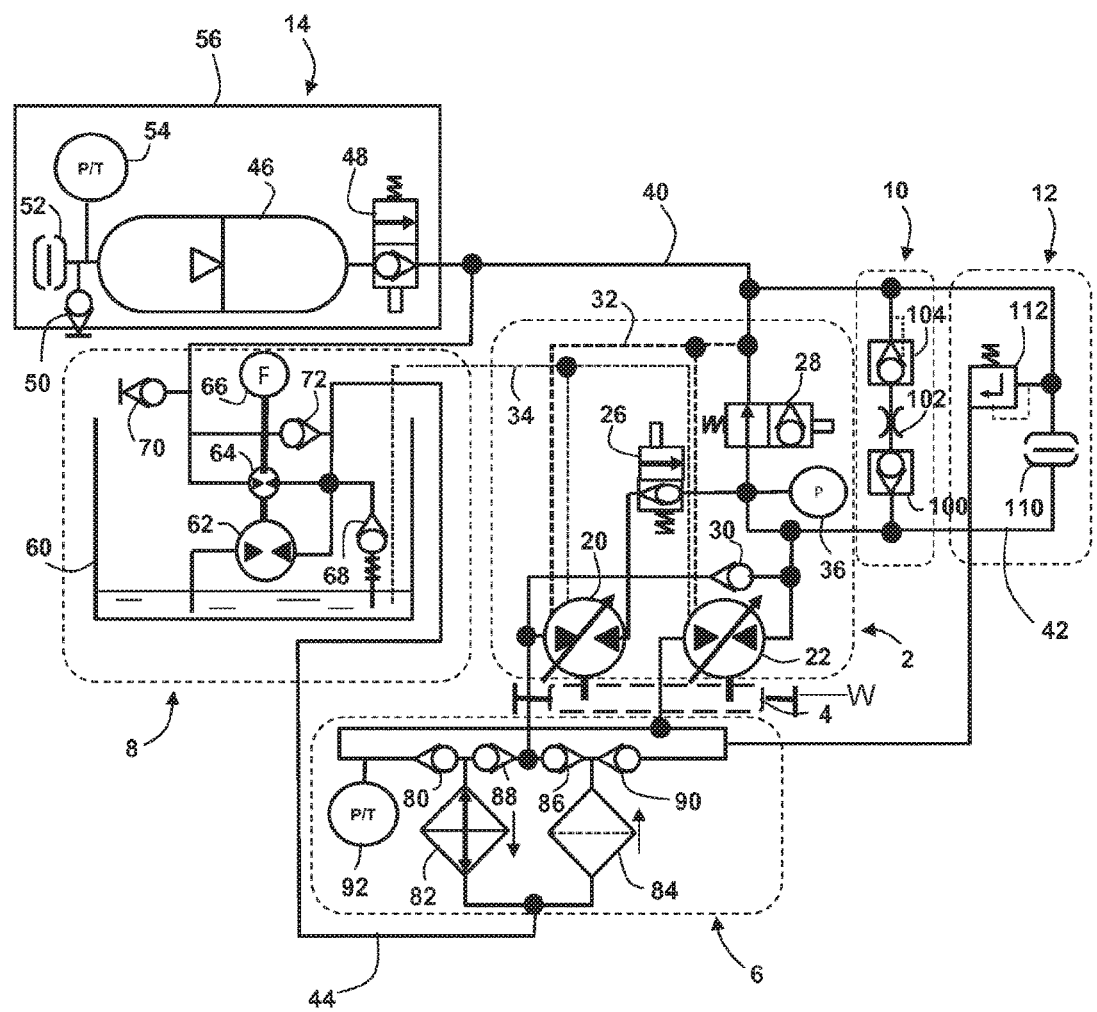
FIG. 1 is a general diagram of a hydraulic system.

The following detailed description illustrates the claimed invention by way of example and not by way of limitation. The description clearly enables one skilled in the art to make and use the claimed invention, describes several embodiments, adaptations, variations, alternatives, and uses of the claimed invention, including what is presently believed to be the best mode of carrying out the claimed invention. Additionally, it is to be understood that the disclosure is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

FIG. 1 presents a first unit 2 comprising a pump which can work as a motor 20 and a hydraulic motor that can work as a pump 22. The shafts of these variable displacement motors are linked to a transmission 4 driving the drive wheels W of the vehicle. The unit 2 also comprises the controls for these motors.

The unit 2 is linked by a limited high pressure circuit 40 to an energy storage unit 14 comprising a pressure accumulator 46. The unit 2 is also linked by a high pressure circuit 42 and by the limited high pressure circuit 40, to a conjunction-disjunction unit 10 and to a safety unit 12 limiting the pressures.

The low pressure portion of the two pumps 20, 22 of the unit 2 is powered by a filter-exchanger unit 6, which receives the fluid through a low pressure circuit 44 from a power supply 8 comprising a reservoir 60 at the atmospheric pressure.

The power supply unit 8 comprises a booster pump 62 drawing from the reservoir 60 at atmospheric pressure, and discharging into the low-pressure circuit 44 which is connected upstream of a main filter 84 and downstream of a heat exchanger 82 from the filter-exchanger unit 6.

The booster pump 62 maintains a minimum pressure in the low pressure circuit 44 in order to avoid cavitation in the pump 20 and in the hydraulic pump 22, especially for high flow rates.

The limited high-pressure hydraulic circuit 40 supplies a low-power hydraulic motor 64 which directly drives the booster pump 62, the motor driving its fluid in the low pressure circuit 44.

An automatic control of the low pressure pump 20 is generated by the booster pump 62, which depends on the pressure differential between the limited high pressure circuits 40 and low pressure circuit 44. A lower pressure in the low pressure circuit 44 increases the power of the motor 64, which boosts the speed of the pump 62 and the level of the pressure. Conversely, a higher pressure in the low pressure circuit 44 decreases the speed of the pump 62, which brings down the pressure level.

A pressure limiting valve 68 in the low pressure circuit 44, arranged in parallel with the booster pump 62 comprises a calibration spring which opens the valve if the low pressure is considerably too high to suppress the fluid in the reservoir 60, which ensures safety.

To bleed the hydraulic circuit, the limited high pressure circuit 40 comprises a circulation vacuum port 70 fitted with an outlet check valve allowing only an air outlet. A communication check valve 72 arranged between the low pressure circuit 44 and limited high pressure circuit 40, only allows a passing from the low to the high pressure. In addition, the booster pump 62 comprises a locking device 66 acting on the hydraulic motor 64, which blocks the pump via the motor.

The method of bleeding of the completely assembled hydraulic circuit is as follows. After blocking the booster pump 62 with the locking device 66 and filling the reservoir 60, a vacuum ventilation is affected by the ventilation port 70, using a workmanship tool, such as a vacuum pump, the valve of the port 70 allows only a passage in this direction.

A second electromagnetic solenoid valve 28 arranged between the high pressure circuits 42 and limited high pressure circuits 40 being open, the air is then drawn at the same time in both of the high pressure circuits, and in the low pressure circuit 44 passing through the communication valve 72 which allows passage in this direction. When the pump 62 is blocked, it does not allow the fluid to pass from the reservoir 60 to the low pressure circuit 44.

Once the vacuum is created, the pump 62 is unlocked by the locking device 66, thereby allowing the vacuum of the three circuits 40, 42, 44 to aspirate fluid from the reservoir 60, passing through the pump, which can rotate freely, and the communication valve 72 in order to fill the high pressure circuits. Then the complete hydraulic circuit fills rapidly, which is performed in a single operation.

The low pressure provided by the reservoir 60 at atmospheric pressure and the booster pump 62, has particular advantage compared to other solutions comprising a low pressure maintained in a closed accumulator, allowing a natural process of degassing of the fluid back into the reservoir 60. The fluid then flows again towards the low and high pressure by the booster pump 62, with a low gas rate that allows it to more easily absorb the gas encountered in these circuits.

The unit 2 comprises the pump 20, which discharges the fluid to the high pressure circuit 42 via a first power electromagnetic solenoid valve 26 comprising at rest a check valve giving free passage to the high-pressure circuit and, when specified, free passage in both directions.

The check valve of the first solenoid valve 26 prevents an inadvertent supply of the pump 20 by the high pressure circuit 42, which would generate a torque in this pump, thus avoiding having to cancel the variable displacement of the machine. The high pressure circuit 42 directly fuels the hydraulic pump 22.

A pressure sensor 36 directly measures the pressure in the high pressure circuit 42, in order to inform the control system of the transmission of the hybrid vehicle, in particular to ensure the control of the two pumps 20, 22 when the accumulator 46 is isolated.

A recirculation check valve 30 is operatively engaged between the inlet of the pump 20 and the high pressure circuit 42, allowing free passage to the latter circuit.

The recirculation valve 30, when the battery is insulated with the second closed electromagnetic power valve 28, allows operation of the hydraulic pump 22 as a pump by removing power from the transmission 4, and the pump 20 as a motor by supplying power to the transmission 4, after having controlled the first magnetic (solenoid) valve 26. The recirculation valve 30 therefore helps to avoid an overpressure in the outlet of the hydraulic pump 22, which would lock these devices.

The second electromagnetic solenoid valve 28 arranged between the limited high pressure circuit 40 and the high pressure circuit 42 comprises, in a resting position, free passage between these two circuits and, in an activated position, a check valve, allowing only a passage to the second circuit.

The second electromagnetic solenoid valve 28, when it is closed, allows the devices to work together with a very high pressure, which may be significantly greater than the operating pressure of the accumulator 46, which is limited to a threshold. It is thus possible in particular to work in a closed loop with the pump 20 driven by a combustion engine of the vehicle, which sends the fluid at a very high pressure to the hydraulic pump 22 so as to obtain very high torques on these two devices. The return outlet of the hydraulic pump 22 at a low pressure, is then sent through the filter-exchanger unit 6 to supply the pump 20.

Note that the very high torques of the two pumps 20, 22, allows obtaining significant power from these systems, while maintaining a good compactness and reduced weight.

The second power electromagnetic solenoid valve 28 also enables intervention to limit a peak pressure too high in the high pressure circuit 42, discharging it into the accumulator 46.

A control conduit 32 connected to the limited high pressure circuit 40, fuels the control of the swash plates of the two pumps 20, 22 in order to adjust their cylinder capacity. Note that the use of limited high pressure which is lower than the very high pressure, allows reducing the sizing of the controls of both pumps 20, 22, and improves the performance by reducing the energy consumed.

In particular, it can provide a limited high pressure of about 200 bars and a maximum threshold of about 350 bars, which is sufficient to operate the various controls and the motor 64 of the booster pump 62. The high pressure circuit 42 may rise well above the threshold.

Each pump 20, 22 has a leakage return drain 34 which extend from their low internal pressure part, to return directly to the tank 60 of the power supply unit 8.

These leakage return drains 34 in particular enable a sweeping of the oil in the housing of these pump 20, 22, as well as their cooling by providing a small minimum leakage flow rate, which can be diluted and cooled in the tank 60, even in the case where it has no operating flow rotating with zero cylinder displacement.

Leakage from these systems can in particular be calibrated to achieve a minimum leakage flow rate for cooling, which is offset by input from the booster pump 62.

The tank 60 thus plays a role in cooling the pumps 20, 22 along with decontamination of this pump, by returning the fluid from them by the drains 34 to the main filter 84 of the filter-exchanger unit 6, passing through the pump booster 62.

The tank 60 also has a safety role to the extent that it can recover the fluid if the accumulator is closed 46, and if the pump 20, 22 are put at zero cylinder displacement.

The energy storage unit 14 connected to the limited high pressure circuit 40 comprises an electromagnetic isolation valve 48 from the accumulator 46, comprising in a rest position a check valve permitting charging of the accumulator and, in a controlled position, a free passage for its emptying. The accumulator gas chamber 46 is connected to a gas filling valve 50 comprising a check valve for filling this, and a pressure and temperature sensor 54 which measures the state of the accumulator.

The accumulator gas chamber 46 is furthermore connected to a rupture disk 52 providing safety by automatically penetrating at a pressure exceeding a threshold to vent the gas. The rupture disk 52 can also be lined with a thermal fuse that opens the passage automatically above a temperature threshold.

The energy storage unit 14 with all its equipment is enclosed in a safety enclosure 56 designed to withstand shocks during vehicle accidents, confining on the inside the total energy of the system and ejecting towards the outside in a safe manner the gas in case of opening the rupture disk 52. The electromagnetic isolation valve 48, normally closed, assures in the case of absence of control, an isolation in the accumulator 46 from the rest of the circuit.

In addition, the constant measuring of pressure and temperature by the sensor 54 connected directly to the accumulator 46, provides information on the state of said accumulator, including when isolated by the solenoid valve 48 which is closed, or when being drained of its oil, it is also isolated, for example, by an anti-extrusion valve of the flexible membrane separating the two chambers, which closes the fluid chamber, leaving a small volume in that room at the end of expansion of the membrane. There is carried out with a minimum of components an optimization of safety in the pressure accumulator 46, which contains all the necessary elements arranged close by to ensure safety in the particular operating conditions of a motor vehicle. In case of accidents the safety of both passengers inside the vehicle, as well as people outside, including rescue workers, is thus achieved.

The filter-exchanger unit 6 forming a fluid processing loop, receives for normal operation the return flow 25 from the hydraulic pump 22, which is guided by a first inlet check valve 80 to the water-oil heat exchanger 82 transmitting the heat from the fluid to the water cooling circuit of the combustion engine of the vehicle. The filter 84 arranged serially at the output of the heat exchanger 82, returns the fluid through a first outlet check valve 86 to the inlet of the pump 20.

For the particular operation of the systems that is reversed, the hydraulic pump 22 operating as a pump, and the pump 20 as a motor displacing the fluid by its low pressure port, the fluid then passes through a second inlet valve 88 providing access to the heat exchanger 82. The fluid passing after the filter 84, then passes through a second outlet valve 90 which leads to the low pressure port of the hydraulic pump 22 operating as a pump.

A recovery is carried out with the four valves 80, 86, 88, 90 in the direction of flow that can come from the pump 20, 22 in one direction or the other, in order to always convey the flow in the same direction, in the heat exchanger 82 and the filter 84, which is essential for the particular filter.

Note that the various valves 80, 86, 88, 90 open automatically in the correct direction thanks to drops in pressure from the exchanger 82 and from the filter 84 giving a difference in pressure between the inlet in the processing loop, and the output which always has a lower pressure.

A pressure and temperature sensor 92 continuously provides information about the fluid in the low pressure side of the pump 20 and the hydraulic pump 22, which especially shows information about the pressure to avoid cavitation, and the temperature of these systems for achieving thermal protection.

The conjunction-disjunction unit 10 successively comprises from the high pressure circuit 42 to the limited high pressure circuit 40, a check valve 100 which only enables a passage to the limited high pressure, then a flow restriction 102, and finally a pilot operated check valve 104 giving free passage to the high-pressure circuit, which can be opened in the opposite direction under the effect of a control.

The check valve 100 prevents a discharge of the accumulator 46, when the second electromagnetic power valve 28 is closed. This ensures that the accumulator 46 will never be empty, which allows always giving a feed rate from the pump controls 20, 22, and the hydraulic motor 64 of the booster pump 62.

The flow restriction 102 allows isolating the two relatively high pressure 42 and limited high pressure circuits 40, avoiding the transmission of hydraulic surges and excessive pressure disturbances, especially with the accumulator 46 comprising a low level of pressure that could fill up quickly, disrupting the high pressure 42.

The pilot operated check valve 104 is controlled when the limited high pressure drops below a minimum pressure threshold, which ensures the maintenance of the power threshold when the second electromagnetic power valve 28 is closed.

The flow rate of the combination-disjunction unit 10 is advantageously provided to substantially compensate the permanent consumption on the limited high pressure circuit 40, coming from in particular the pump controls 20, 22 and from the hydraulic motor 64, in order to limit the power of the booster pump 62 supplying these systems the necessary minimum. Permanent consumption excludes occasional consumption providing high power to supply the pumps 20, 22, which are done by the second power electromagnetic power valve 28.

The safety unit 12 successively comprises from the high pressure circuit 42 to the limited high pressure circuit 40, a rupture disk 110 limiting the difference between the high pressure and the limited high pressure, at a maximum value, and a calibrated pressure relief valve 112 which discharges into the low pressure circuit, at the level of the output of the hydraulic pump 22.

The rupture disk 110 comprises a resistance membrane calibrated with its rupture to protect the two circuits against overpressure coming from one side or the other. The rupture disk 110 preferably supports additional pressure coming from the accumulator 46. The rupture disk 110 may also be coupled with a thermal fuse that opens the passage automatically above a temperature threshold.

When the pressure accumulator 46 is connected to a high pressure circuit 42 with the second opened electromagnetic solenoid valve 28 the accumulator is protected by the calibrated pressure relief valve 112. The control strategies of the electromagnetic solenoid valve 28 can also protect the accumulator 46, in particular starting from the measurement of the pressure sensor 54 connected directly.

When the pressure accumulator 46 is disconnected from the high pressure circuit 42 that may involve a low or zero pressure, the accumulator 46 has its pressure which is limited by the calibrated pressure relief valve 112, and is protected against overpressure by the rupture disk 110 which can open to the high pressure circuit. Note that in case of opening the rupture disk 110, the hydraulic system can continue to operate, thereby avoiding stopping the vehicle, but with a pressure in the high pressure circuit 42 which is limited by the acceptable operating pressure in the accumulator 46.

The hydraulic system also has the advantage, particularly in the case motorization of the hybrid vehicle including the transmission 4 and the pumps 20, 22, installed at the front, and the accumulator 46 installed in the center or rear of the vehicle, to concentrate very high pressure at the front, and have a limited high-pressure pipe 40 running along the vehicle for connecting these systems to the accumulator. This reduces the losses with a short circuit for the very high pressure, and a longer circuit for the limited pressure.

Figure 2:
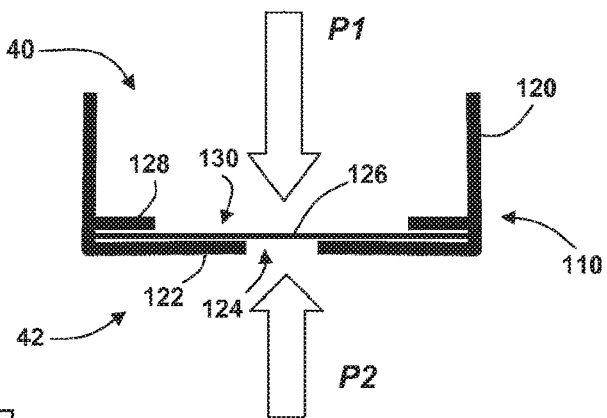
FIG. 2 is a diagram of a pressure rupture disk of the hydraulic system.

FIG. 2 presents a rupture disk 110 comprising a circular support section 120 arranged in a conduit connecting the high pressure circuit 42 at the bottom, to the limited high pressure circuit 40 located above. The support 120 comprises a transverse partition 122 featuring a perforation in reduced diameter 124 receiving a membrane 126 which is plated above.

The contour of the membrane 126 is covered above by a shoulder 128 also forming a transverse partition, leaving on the inside a perforation 130 of a larger diameter. The rupture disk 110 is provided to support in each direction a pressure differential, said differential being greater when the upper pressure P1 is greater than the lower pressure P2.

When the upper pressure P1 is larger, only the central portion of the membrane 126 corresponding to the small perforation 124 is subjected to the pressure differential, the rest being supported by the partition 122. The surface of the small perforation 124 is reduced, the force applied to the membrane 126 in front of the drill is also reduced to the same pressure. The rupture is obtained with a large pressure differential.

When the lower pressure P2 is greater, the central portion of the membrane 126 corresponding to the larger perforation 130 is subjected to the pressure differential, the rest being supported by the shoulder 128. The surface of the large hole 130 being important, the force applied to the membrane 126 in front of the perforation is as important to a same pressure. The rupture is achieved with a lower pressure differential than in the previous case.

Figure 3:
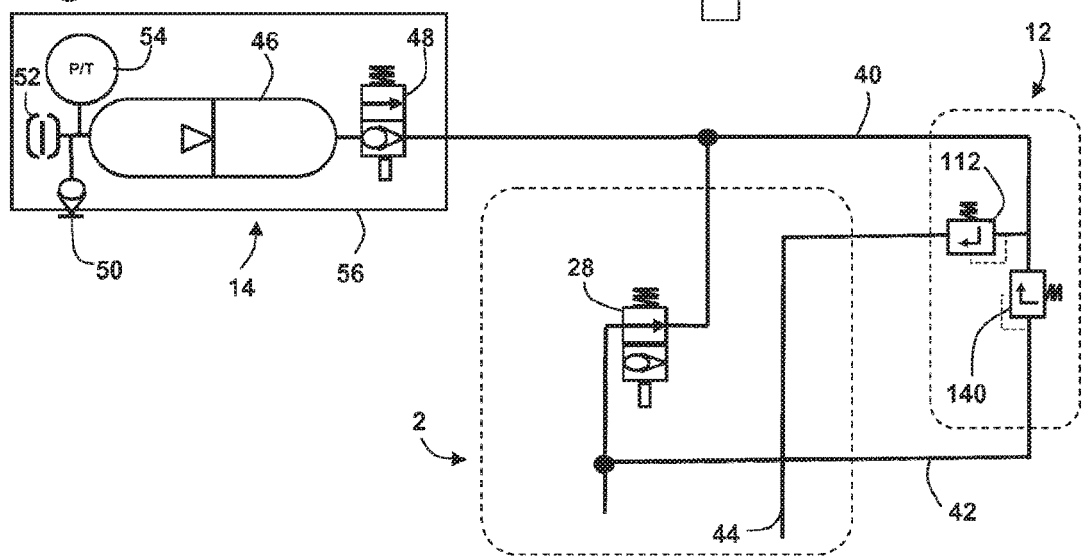
FIG. 3 is a diagram of a first alternate embodiment of the hydraulic system.

FIG. 3 shows a similar hydraulic system to that shown in FIG. 1, with a modification as a lack of combination-disjunction unit 10, and a second calibrated pressure relief valve 140 arranged in place of the rupture disk, which limits the high pressure 42 to convey the fluid to the limited high pressure 40. In case of accidental peak pressure on the high pressure circuit 42, the second pressure relief valve 140 then sends the fluid to the accumulator 46.

This produces the charging of the limited high-pressure circuit 40, replacing with the second pressure relief valve 140 the conjunction-disjunction unit 10. Moreover, if the pressure is too high in the limited high pressure circuit 40, then the first pressure relief valve 112 brings it down. Moreover, the second pressure relief valve 140 protects the high pressure circuit 42 in case of abnormal pressure, opening and rejecting the fluid in the limited high pressure circuit 40 which can be received by the accumulator 46. The return of the fluid in the accumulator 46 recovers energy.

Figure 4:
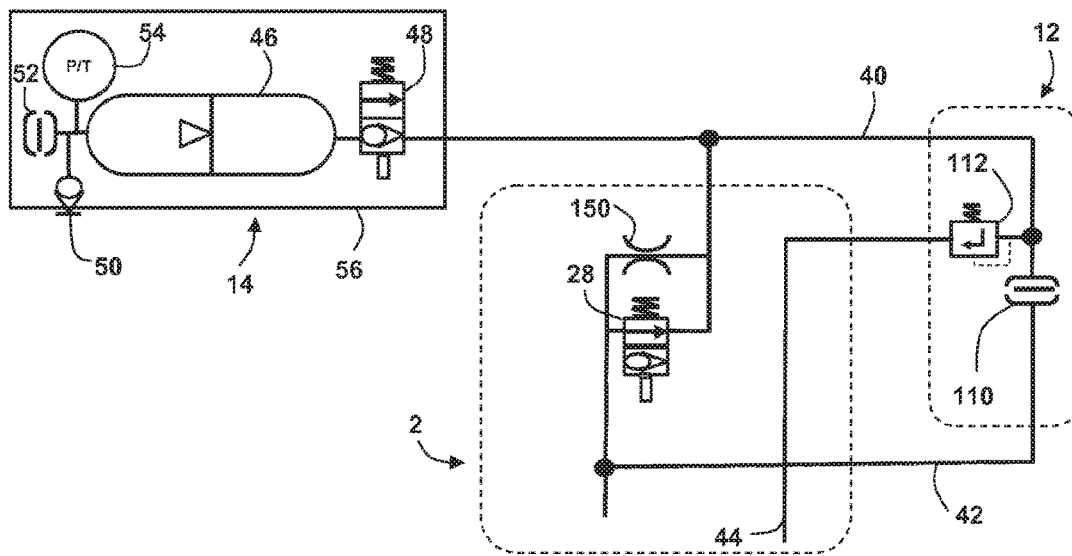
FIG. 4 is a diagram of a second alternate embodiment of the hydraulic system.

FIG. 4 shows a similar hydraulic circuit to that shown in FIG. 3, having as a modification the rupture disk 110 provided instead of the second pressure relief valve 140 and a flow restriction 150 arranged parallel to the second electromagnetic power valve 28. Recharging the limited high-pressure circuit 40 is carried out continuously from the high pressure circuit 42, the restriction 150 giving a leakage rate calculated according to the permanent consumption made on the accumulator 46.

In case of too much pressure in the limited high pressure circuit 40 coming, for example, from excessive pressure difference over the restriction 150, then the first pressure relief valve 112 rejects the fluid in the low pressure circuit 44 to return to equilibrium. The rupture disk 110 intervenes as before, to protect both circuits 40, 42 from accidental overpressure.

Figure 5:
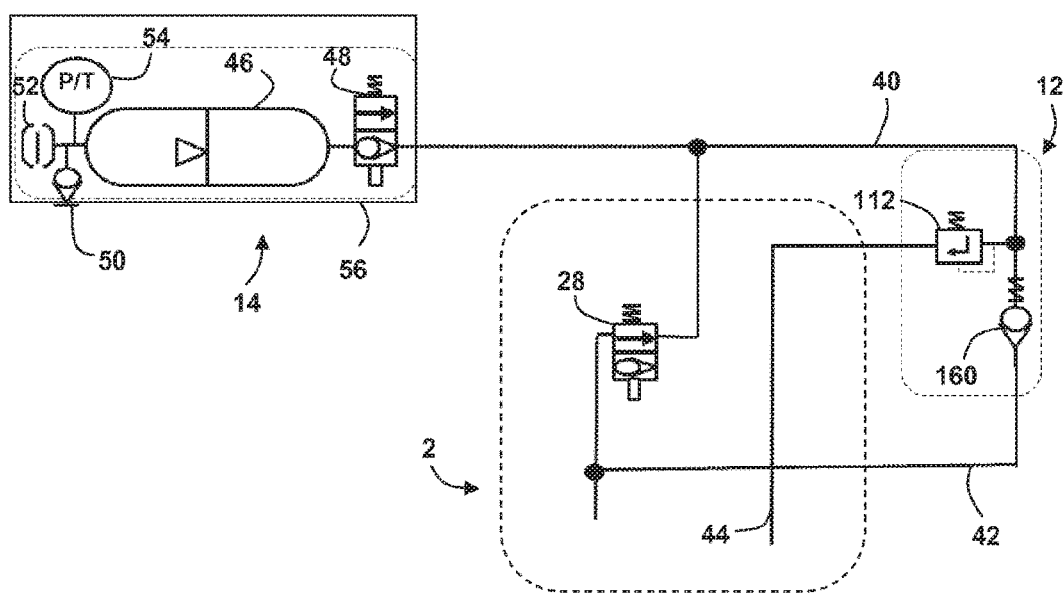
FIG. 5 is a diagram of a third alternate embodiment of the hydraulic system.

FIG. 5 shows a hydraulic circuit similar to that shown in FIG. 3, having as a modification a check valve equipped with a calibration spring 160, placed at the place of the second pressure relief valve 140. The flow is blocked by the calibrated check valve 160 towards the high pressure circuit 42, but it is possible in the other direction towards the limited high pressure 40 from a sufficient pressure differential to allow compression of the calibrating spring. A protection of the high pressure circuit 42 is thus achieved with the calibrated check valve 160 which opens in case of the circuit overload.

In addition to FIGS. 3 and 5, the flow restriction 150 may also be arranged parallel to the second electromagnetic power valve 28, as shown in FIG. 4, to obtain a recharging leakage rate from the limited high pressure circuit 40.

Note that the second pressure relief valve 140, the check valve 160 and the calibrated rupture disk 110, have as the main function the limiting of the pressure difference between the two high pressure circuits 42 and limited high pressure circuit 40, in protecting the first circuit. On the other hand, if opened after a peak in accidental pressure, the rupture disk 110 requires intervention to change, while the other two components are not damaged, which allows the vehicle to continue to function normally.

Different types of transmission can generally be used with the hydraulic circuit according to the invention, the transmission shown in the prior art given only by way of example of use of the hydraulic circuit.

By its number of optimized components, the hydraulic circuit in particular meets the constraints of motor vehicles, especially as regards the safety, yield, consumption reduction, cost, size and weight, and ease of maintenance.

Changes can be made in the above constructions without departing from the scope of the disclosure, it is intended that all matter contained in the above description or shown in the accompanying drawings shall be interpreted as illustrative and not in a limiting sense.

The invention claimed is:

1. A hydraulic circuit for a hybrid vehicle comprising:
a hydraulic machine and a pump connected to transmission driving wheels of the hybrid vehicle, the hydraulic machine and the pump being connected together to enable direct exchange of fluid in a high pressure circuit having no pressure accumulator;
wherein the high pressure circuit comprises a safety assembly which in case of overpressure discharges the fluid to a limited pressure circuit equipped with a pressure accumulator;
wherein pressure in the limited pressure circuit is between 200 and 350 bar, pressure in the high pressure circuit is greater than 350 bars, and the safety assembly comprises a rupture disk which opens in response to a differential pressure exceeding a threshold.

2. The hydraulic circuit according to claim 1, wherein the rupture disk opens in response to pressure differential thresholds which change according to direction, the threshold being higher when the pressure of limited pressure circuit is greater than the pressure of the high pressure circuit.

3. The hydraulic circuit according to claim 2, wherein the rupture disk comprises a membrane separating the limited pressure circuit and the high pressure circuit, the membrane being supported by a partition defined by two transverse members to achieve a different rupture threshold.

4. The hydraulic circuit according to claim 3, wherein the rupture disk comprises a circular section support that receives the membrane inside; wherein, the membrane is supported on either side on two transverse partitions having axial perforations of different diameters.

5. The hydraulic circuit according claim 1, wherein the safety assembly comprises a calibrated pressure relief valve which discharges into the limited pressure circuit.

6. The hydraulic circuit according to claim 1, wherein the safety assembly comprises a calibrated nonreturn valve blocking flow to the high pressure circuit, the nonreturn valve opening in another direction in response to a sufficient pressure differential.

7. The hydraulic circuit according to claim 1, wherein recharging of the limited pressure circuit for compensating its permanent consumption is affected by the high pressure circuit via a restrictor that is constantly open.

8. A hybrid motor vehicle having a power train using hydraulic power, comprising: a hydraulic machine and a pump connected to transmission driving wheels of the hybrid vehicle, the hydraulic machine and the pump being connected together to enable direct exchange of fluid in a high pressure circuit having no pressure accumulator;
wherein the high pressure circuit comprises a safety assembly which in case of overpressure discharges the fluid to a limited pressure circuit equipped with a pressure accumulator;
wherein pressure in the limited pressure circuit is between 200 and 350 bar, pressure in the high pressure circuit is greater than 350 bars, and the safety assembly comprises a rupture disk which opens to a differential pressure exceeding a threshold.

* * * * *